US010893144B2

(12) United States Patent
Lee et al.

(10) Patent No.: US 10,893,144 B2
(45) Date of Patent: Jan. 12, 2021

(54) ELECTRONIC APPARATUS AND CONTROL METHOD THEREOF (71) Applicant: SAMSUNG ELECTRONICS CO., LTD., Suwon-si (KR)

(72) Inventors: Kyu-haeng Lee, Seoul (KR); Sangsoon Lim, Seoul (KR); Woo-jin Park, Yongin-si (KR); Dae-hyun Ban, Seoul (KR); Seong-won Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 589 days.

(21) Appl. No.: 15/793,307

(22) Filed: Oct. 25, 2017

(65) Prior Publication Data

US 2018/0124244 A1 May 3, 2018

Related U.S. Application Data

(60) Provisional application No. 62/413,552, filed on Oct. 27, 2016.

(30) Foreign Application Priority Data

Jun. 7, 2017 (KR) .......................... 10-2017-0070788

(51) Int. Cl.
*H04M 3/51* (2006.01)
*H04W 8/18* (2009.01)
(Continued)

(52) U.S. Cl.
CPC ......... *H04M 3/5183* (2013.01); *B60R 16/023* (2013.01); *G07C 5/008* (2013.01);
(Continued)

(58) Field of Classification Search
CPC ... H04M 3/5183; G07C 5/0825; G07C 5/008; H04W 8/18; H04W 48/14; H04W 60/06;
(Continued)

(56) References Cited

U.S. PATENT DOCUMENTS 8,484,640 B1 7/2013 Dobrovolskiy et al.
9,113,417 B2 8/2015 Lee et al.
(Continued)

FOREIGN PATENT DOCUMENTS

JP 2013-258678 12/2013
KR 10-0539804 1/2006
KR 10-2014-0059665 5/2014

*Primary Examiner* — Adam R Mott
(74) *Attorney, Agent, or Firm* — Nixon & Vanderhye P.C.

(57) ABSTRACT

An electronic apparatus mounted on a vehicle is provided. The electronic apparatus according to an example embodiment includes a communicator comprising communication circuitry configured to communicate with an external device, an application processor (AP), and a micro controller unit (MCU) comprising a micro controller configured to turn on a power source of the AP in response to a communication connection request being received from the external device in a state in which the power source of the AP is turned off, wherein the AP, in response to a control command being received from the external device after the power source is turned on, is configured to provide telematics service according to the received control command.

10 Claims, 5 Drawing Sheets

(51) Int. Cl.
   *H04W 48/14*   (2009.01)
   *G07C 5/00*    (2006.01)
   *H04W 60/06*   (2009.01)
   *B60R 16/023*  (2006.01)
   *H04W 48/16*   (2009.01)
   *G07C 5/08*    (2006.01)
   *H04W 52/02*   (2009.01)
   *H04W 68/00*   (2009.01)

(52) U.S. Cl.
   CPC ............ *G07C 5/0825* (2013.01); *H04W 8/18* (2013.01); *H04W 48/14* (2013.01); *H04W 48/16* (2013.01); *H04W 60/06* (2013.01); *H04W 52/0277* (2013.01); *H04W 68/005* (2013.01); *Y02D 30/70* (2020.08)

(58) Field of Classification Search
   CPC ............ H04W 48/16; H04W 52/0277; H04W 68/005; H04W 76/28; B60R 16/023; Y02D 30/70
   See application file for complete search history.

(56) References Cited

U.S. PATENT DOCUMENTS

| | | | |
|---|---|---|---|
| 9,584,646 B2* | 2/2017 | Shaout | H04M 1/7253 |
| 9,734,119 B1* | 8/2017 | Chetverikov | G06F 13/4282 |
| 2005/0143146 A1 | 6/2005 | Kim | |
| 2008/0162968 A1* | 7/2008 | Breen | G06F 1/3203 |
| | | | 713/323 |
| 2015/0334687 A1* | 11/2015 | Ventulett | H04M 11/04 |
| | | | 455/419 |
| 2016/0309527 A1 | 10/2016 | Chen et al. | |

\* cited by examiner

ELECTRONIC APPARATUS AND CONTROL METHOD THEREOF

CROSS-REFERENCE TO RELATED APPLICATIONS

This application is based on and claims priority under 35 U.S.C. § 119 to Korean Patent Application No. 10-2017-0070788, filed in the Korean Intellectual Property Office on filed on Jun. 7, 2017, and U.S. Provisional Application No. 62/413,552, filed in the U.S. Patent and Trademark Office on Oct. 27, 2016, the disclosures of which are incorporated by reference herein in their entireties.

BACKGROUND

1. Field

The present disclosure relates generally to an electronic apparatus and a method of controlling the same, and for example, to an electronic apparatus which provides telematics service and a control method thereof.

2. Description of Related Art

Recently, telematics technology for controlling a main information system of a vehicle using remote telecommunication has attracted attention. Telematics is a compound of telecommunication and informatics and used for performing various functions such as remote start, door opening/closing, air conditioning control, self-diagnosis of vehicle condition, consumable parts management, etc, of the vehicle through a personal terminal device by connecting the personal terminal device such as a smartphone, a tablet PC, etc. with a telematics control unit (TCU) of the vehicle. In addition, it has become possible to inform the police of the location and route of the vehicle in an emergency such as vehicle theft via a global positioning system (GPS) in real time.

In the meantime, in order to support the telematics service, a cellular modem attached to the TCU of the vehicle may be always on for allowing the cellular modem to exchange data with an application of a smartphone based on SMS (short message service). Therefore, the cellular modem may perform communication with a base station in a sleep mode so as to support the telematics service such as the remote start even when the vehicle is stopped, turned off or not running.

However, since all operations related to driving the telematics service are performed in an application processor (AP) included in the TCU of the vehicle, a power source of the AP may be always turned on. As a result, the time for providing the telematics service may be reduced since a current is excessively consumed by the AP and a battery power is limited. Due to the above, depending on the manufacturer of a device providing the telematics service, the telematics service may be provided only for a predetermined period of time after the vehicle stops, and thereafter, the sleep mode may be terminated and the power source of the AP may be cut off.

In such a case, a user may not recognize that the power source of the AP is cut off, and thus the telematics service may not be provided when needed.

Therefore, there is a desperate demand for improving a low power operation of the cellular modem in the vehicle.

SUMMARY

An aspect of the example embodiments relates to providing a telematics control unit (TCU) providing a telematics service with a low power consumption and a method of controlling the same.

According to an example embodiment, an electronic apparatus mounted on a vehicle is provided, including a communicator comprising communication circuitry configured to communicate with an external device, an application processor (AP), and a micro controller unit (MCU) comprising a micro controller configured to turn on a power source of the AP in response to a communication connection request being received from the external device in a state in which the power source of the AP is turned off (or in a sleep mode), wherein the AP, in response to a control command being received from the external device after the power source is turned on, is configured to provide telematics service based on the received control command.

The MCU, in response to a connection request being received from the external device, may transmit a response signal regarding the connection request to the external device, and in response to the control command being received from the external device, may transmit the received control command to the AP.

The MCU may control the communicator to turn on a power source based on a predetermined period, and in response to the power source being turned on, to perform paging of a connection request from the external device.

The MCU may adjust a period in which the power source is turned on based on a remaining battery power of the vehicle.

The MCU may turn off the power source of the AP when the vehicle is stopped or turned off.

The AP may implement radio interface layer (RIL) daemon and point-to-point protocol (PPP) daemon in response to the power source being turned on.

According to an example embodiment, a method of controlling an electronic apparatus mounted on a vehicle is provided, including turning off a power source of an application processor (AP), receiving a communication connection request from an external device through a micro controller of a micro controller unit (MCU), turning on the power source of the AP based on the communication connection request, receiving a control command from the external device, and providing telematics service supplied from the AP based on the received control command.

The receiving of the control command from the external device may include transmitting a response signal regarding the communication connection request to the external device in response to the communication connection request being received, receiving the control command from the external device through the MCU in response to the external device receiving the response signal, and transmitting a control command provided to the MCU to the AP.

The method may further include turning on a power source of the MCU based on a predetermined period, and paging a connection request from the external device in response to the power source of the MCU being turned on.

The turning on of the power source of the MCU based on the predetermined period may include adjusting a period in which the power source of the MCU is turned on based on a remaining battery power of the vehicle.

The turning off of the power source of the AP may include turning off the power source of the AP when the vehicle is stopped or turned off.

The turning on of the power source of the AP based on the communication connection request may include implementing radio interface layer (RIL) daemon and point-to-point protocol (PPP) daemon of the AP.

According to the above-described various example embodiments, telematics service may be stably provided for a longer period of time by reducing power consumed by the TCU.

BRIEF DESCRIPTION OF THE DRAWINGS

The above and/or other aspects, features and attendant advantages of the present disclosure will be more apparent and readily understood from the following detailed description, taken in conjunction with the accompanying drawings, in which like reference numerals refer to like elements, and wherein.

DETAILED DESCRIPTION

Prior to explaining various example embodiments of the present disclosure, an explanation will be made on a method by which embodiments of the present disclosure and drawings are described.

The example embodiments of the present disclosure may be diversely modified. Accordingly, specific example embodiments are illustrated in the drawings and are described in detail in the detailed description. However, it is to be understood that the present disclosure is not limited to a specific example embodiment, but includes all modifications, equivalents, and substitutions without departing from the scope and spirit of the present disclosure. Also, well-known functions or constructions are not described in detail since they would obscure the disclosure with unnecessary detail.

The terms used in the present disclosure and the claims are general terms selected in consideration of the functions of the various embodiments of the present disclosure. However, these terms may vary depending on intention, legal or technical interpretation, emergence of new technologies, and the like of those skilled in the related art. Further, some of the terms may be arbitrarily selected. These terms may be construed as having meanings defined in the present disclosure and may be construed based on the entire contents of the present disclosure and common technical knowledge of the art as long as there are no detailed definitions of the terms.

Further, like reference numerals indicate like components that perform substantially the same functions throughout the disclosure. For ease of explanation and understanding, different embodiments are described with reference to like reference numerals. That is, even if all the components in the plurality of drawings have like reference numerals, it does not mean that the plurality of drawings refer to only one embodiment.

Also, the terms "first," "second," etc. may be used to describe diverse components, but the components are not limited by the terms. These terms are used for the purpose of differentiating one component from another, without limitation thereto. For example, a numerical expression combined with a component should not limit the order of use or order of arrangement of the component. The respective ordinal numbers are interchangeably used, if necessary.

The singular expression also includes the plural meaning as long as it does not conflict with the context. In this disclosure, terms such as 'include' and 'have/has' should be construed as designating that there are such characteristics, numbers, operations, elements, components or a combination thereof in the specification, not to exclude the existence or possibility of adding one or more of other characteristics, numbers, operations, elements, components or a combination thereof.

In the embodiments of the present disclosure, terms such as "module", "unit", "part", and the like are terms used to indicate components that perform at least one function and operation, and these components may be realized in hardware, software or any combination thereof. In addition, a plurality of "modules," a plurality of "units," a plurality of "parts" may be integrated into at least one module or chip except for a "module," a "unit," or a "part" which has to be implemented with specific hardware, and may be implemented with at least one processor (not shown).

Further, in various example embodiments of the present disclosure, when it is described that a portion is connected to another portion, the portion may be either connected directly to the other portion, or connected indirectly via another medium. Further, when it is described that a portion includes another component, it does not exclude the possibility of including other components, that is, the portion may further include other components besides the described component.

Hereinafter, various example embodiments of the present disclosure will be explained in greater detail with reference to the drawings.

Figure 1:
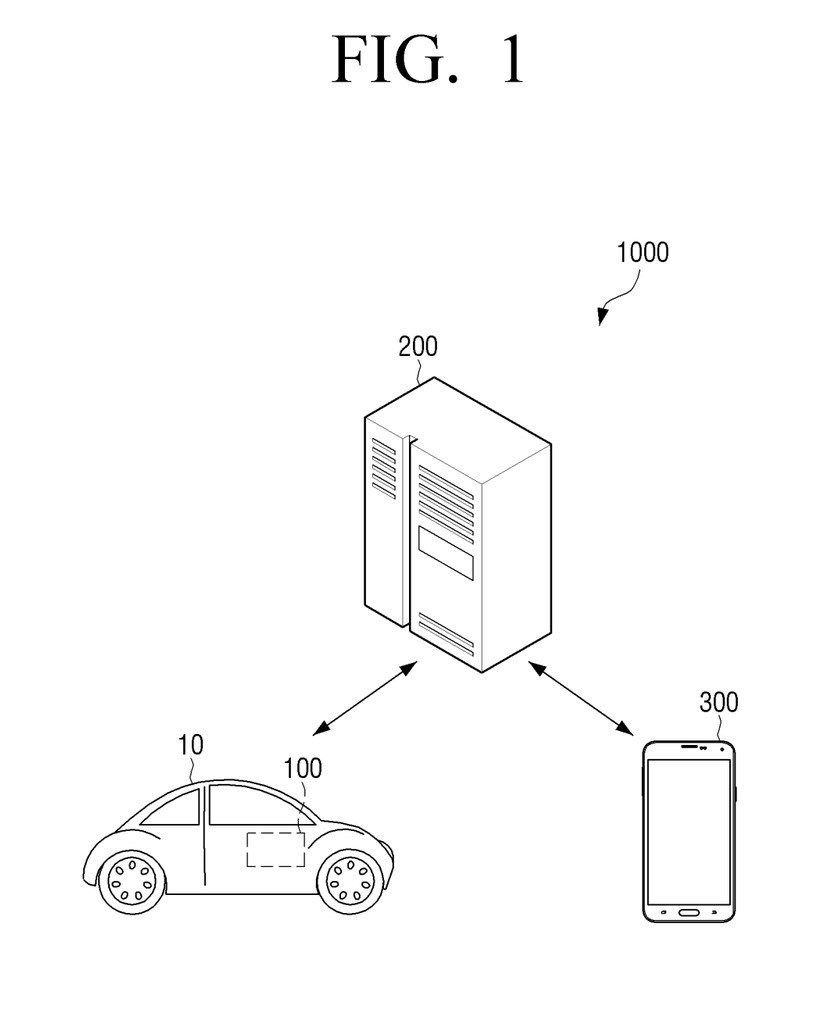
FIG. 1 is a diagram illustrating an example telematics system according to an example embodiment.

FIG. 1 is a diagram illustrating an example telematics system according to an example embodiment.

A telematics system 1000 providing telematics service may include a telematics device 100 included in a vehicle 10, a telematics server 200 and a user terminal device 300.

The telematics service may refer, for example, and without limitation, to providing information on car accident, theft detection, driving direction guidance, traffic, daily life, or the like to a driver by integrating mobile communication technology and location tracking technology into a vehicle.

Examples of the vehicle 10 may include a road vehicle such as an automobile, a truck, a bus, or the like, an underwater vehicle such as a ship, a boat, or the like, a flight vehicle such as an airplane, an air craft, a helicopter, or the like, and a rail vehicle such as a train, or the like, but is not limited thereto.

The telematics device 100 may be mounted on the vehicle 10 and be configured to provide the telematics service. Telematics device 100 may be a term that is used to intuitively indicate the meaning for convenience of explanation and may refer, for example, and without limitation, to various electronic apparatuses capable of transmitting and receiving information related to the vehicle 10 by being remotely controlled.

The telematics device 100 may directly perform communication with the user terminal device 300, but may perform communication with the telematics server 200. The telematics device 100 may perform communication with the telematics server 200, thereby receiving a remote control command from the user terminal device 300 from the telematics server 200, or transmitting various information of the vehicle 10 to be provided to the user terminal device 300 to the telematics server 200. That is, telematics device 100 may perform communication with the user terminal device 300 via the telematics server 200 using a mobile communication method.

The telematics device 100 may enter a sleep mode, which is driven with a low power consumption when the vehicle 10 stopped or turned off. Although being driven with the low power consumption, the telematics device 100 may periodically receive an Rx signal and receive a remote control command triggered by the user terminal device 300 from the telematics server 200.

The telematics service may be provided by the telematics server 200. The telematics server 200 may be commonly referred to as an application server. The telematics server 200 may be a term used for intuitively indicating the meaning for convenience of explanation, and refer, for example, to various servers for transmitting the remote control command received from the user terminal device 300 to the telematics device 100, or transmitting vehicle information received from the telematics device 100 to the user terminal device 300. Therefore, basically, the telematics server 200 may perform communication with the telematics device 100 and the user terminal device 300 in various ways.

The telematics server 200 may for example, and without limitation, include a base station for transmitting and receiving wireless signals, or an external terminal by a communication method based on a technical standard for mobile communication with the telematics device 100.

The telematics server 200 may receive information related to the vehicle 10 equipped with the telematics device 100 from the telematics device 100 through the mobile communication. For example, the telematics server 200 may receive driving information such as a driving speed, a driving distance of the vehicle 10, etc., and information on a driver, communication status of the vehicle 10, remaining battery power, etc. from the telematics device 100. Various information that the telematics server 200 receives from the telematics device 100 may be provided in addition to the above-described information. The telematics server 200 may transmit information received from the telematics device 100 to the user terminal device 300.

In the meantime, the telematics server 200 may receive various remote control commands from the user terminal device 300 through the mobile communication. The user terminal device 300 may drive an application capable of establishing communication connection with the telematics server 200 and transmit the remote control command for performing remote start, remote air conditioning, remote door lock/unlock, etc. of the vehicle 10 to the telematics server 200 through the driven application. The telematics server 200 may transmit information received from the user terminal device 300 to the telematics device 100.

The telematics server 200 may include a data base (not shown), and the data base may include information related to the telematics device 100 and the user terminal device 300. In addition, the data base of the telematics server 20 may store user identification information (an identification, a password, etc.) of the user terminal device 300.

The user terminal device 300 may refer to a terminal device in a mobile environment that a user carries around such as a personal computer (PC), a smartphone, or the like, but is not limited thereto. The user terminal device 300 may directly perform communication with the telematics device 100, but may perform communication with the telematics server 200 over a wireless data network.

For example, the user terminal device 300 may control the telematics device 100 through the telematics server 200, for example, the user terminal device 300 may transmit the control command for performing the remote start, the remote air conditioning, the remote door lock/unlock, etc. of the telematics device 100 to the telematics device 100 through the telematics server 200. In addition, the user terminal device 300 may receive various information on the vehicle 10 such as parking location, etc. from the telematics device 100 through the telematics server 200.

Figure 2:
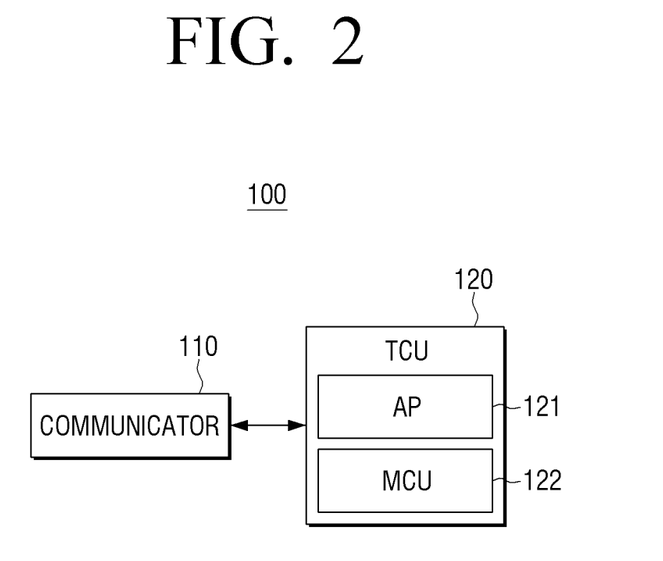
FIG. 2 is a block diagram illustrating an example configuration of a telematics device according to an example embodiment.

FIG. 2 is a block diagram illustrating an example configuration of a telematics device according to an example embodiment.

Referring to FIG. 2, the telematics device 100 may include a communicator (e.g., including communication circuitry) 110 and a telematics control unit (TCU) (e.g., including processing circuitry) 120.

The communicator 110 may include various communication circuitry and be configured to perform communication with an external device. According to an embodiment, the external device may be the telematics server 200 or the user terminal device 300. For example, according to an embodiment, the telematics device 100 may perform communication with the user terminal device 30 via the telematics server 200. According to another embodiment, the telematics device 100 may directly perform communication with the user terminal device 300 without the telematics server 200. In the following description, the external device will be described as the telematics server 200 only.

The communicator 110 may be configured to perform communication with the telematics server 200. The communicator 110 may include various communication circuitry, such as, for example, and without limitation, a cellular modem that performs communication with the telematics server 200 using wireless communication.

The communicator 100 may transmit and receive wireless signals with the telematics server 200 over a mobile communication network established according to the technical standards for the mobile communication, for example, Global System for Mobile Communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCMA), High Speed Downlink Packet Access (HSDPA), High Speed Uplink Packet Access (HSUPA), Long Term Evolution (LTE), Long Term Evolution-Advanced (LTE-A), or the like, but is not limited thereto. The wireless signals may include a voice call signal, a video call signal, or various forms of data according to transmission and reception of text/multimedia message.

In addition, the communicator 110 may support Wi-Fi, Blue-tooth, Wi-Fi Direct, or the like, but is not limited thereto.

In the meantime, the communicator 110 may include an identification module. The identification module may be a chip storing various information for authentication of use authority of the telematics device 100 and may include, for example, and without limitation, a User Identity Module (UIM), Subscriber Identify Module (SIM), Universal Subscriber Identify Module (USIM), or the like. However, according to an embodiment, a device including the identification module may be embodied as a card, or the like, to be connected to the telematics device 100 through a separate port.

The telematics control unit (TCU) 120 may commonly control overall operations of the telematics device 100. For example, the TCU 120 may perform controlling and processing of data communication, video call, route search, vehicle control, and the like.

The TCU 120 may include various processing circuitry, such as, for example, and without limitation, an application processor (AP) 121 and a micro controller unit (MCU) (e.g., including a micro controller) 122.

The AP 121 may include an Operating System (OS) mounted on the telematics device 100 and a System-On-Chip (SOC) for driving various applications. The AP 121 may include various processing circuitry, such as, for example, and without limitation, a dedicated processor, a Central Processing Unit (CPU), a Graphics Processing Unit (GPU), a communication chip, an Internet Service Provider (ISP) chip, or the like.

Specifically, the AP 121 may implement radio interface layer (RIL) daemon which supports a wireless link layer for voice communication, and point-to-point protocol daemon for supporting a data link layer for data communication.

The RIL daemon may initialize a Vendor RIL, process all communications from, for example, and without limitation, android telephony services and forward a call to the vendor RIL through a solicited command. The PPP daemon may perform functions such as initialization and authentication phases required before actual network traffic through a link in conformity of standard protocol established by the Internet Engineering Task Force (IETF).

According to an embodiment, the AP 121 may maintain a turned-off state of a power source when a vehicle is stopped or turned off. The turned-off state may indicate that the power source is not supplied, and broadly indicate a low-power state in which the supply of the power source is uniformly limited. On the other hand, a turned-on state may indicate that the power source is supplied, and broadly indicate a state in which the power source is properly supplied without being particularly limited.

The micro controller unit (MCU) 122 may include various processing circuitry, such as, for example, and without limitation, a processor controlling the communicator 110 and the AP 121. The MCU 122 may be directly connected with the communicator 110 and operate the communicator 110. According to another embodiment, the communicator 110 may be directly connected to the AP 121 in addition to the MCU 122.

The MCU 122 may monitor the paging of the communicator 110 in a state in which the AP 121 is turned off and determine whether the communicator 110 receives a communication connection request (a paging message) from the telematics server 200. In other words, when the AP 121 is turned off, the MCU 122 may be continuously supplied with a power source.

When it is determined that the communicator 110 receives the communication connection request, the MCU 122 may turn on the power source of the AP 121 and control the communicator 110 to transmit a response signal in response to the communication connection request to the telematics server 200. In response to the control command being received from the telematics server 200 to which the response signal is transmitted, the MCU 122 may transmit the received control command to the AP 121. Since the power source is turned on, the AP 121 may implement the RIL daemon and the PPP daemon and provide the telematics service based on the received control command.

The TCU 120 may separately mount a telematics service support logic on the AP 121 which has a relatively large power consumption and the MCU 122 which has a relatively small power consumption and turn on the power source of the AP 121 only in response to the communication connection being received, thereby reducing power consumed by the TCU 120.

In the meantime, the MCU 122 may be periodically turned on/off. Accordingly, the power consumed by the MCU 122 may be further reduced. In such a case, since the MCU 122 is periodically turned on/off, the communicator 110 may perform paging on a predetermined period basis. For example, the communicator 110 may check whether the communication connection request (the paging message) is received from the telematics server 200 as the MCU 122 is turned on.

Due to a communication error, etc. caused by a period turning off of the MCU 122, the remote control command from the user terminal device 300 may not be properly provided to the communicator 110. In order to address this problem, the telematics server 200 may store the remote control command received from the user terminal device 300. The MCU 122 may be provided with an algorithm for checking a pending remote control command in the telematics server 200.

For example, the user may request remote control service from the telematics server 200 using the user terminal device 300, and in the case there is no response from the telematics device 100 when the remote control command for the remote control service is transmitted from the telematics server 200, the remote control command may be stored in the data base, or the like, of the telematics sever 200 in case of the occurrence of communication error. The telematics server 200 may try to establish a communication connection with the telematics device 100 at predetermined time intervals, and when the communication connection is established, the telematics server 200 may transmit the remote control command to the telematics device 100.

The MCU 122 may adjust a paging period for monitoring a wireless paging channel of the communicator 110. For example, the MCU 122, in the case of CDMA, may adjust a Slot Cycle Index (SCI) value, and in the case of LTE, adjust a Discontinuous Reception (DRX) value for adjusting the paging period. Therefore, according to the variation of paging period, the power consumption amount of the communicator 110 may be adjusted.

The telematics device 100 may include a display (not shown) disposed on a front part in the vehicle 10 and provide audio, video and navigation functions. The telematics device 100 may include a terminal location information receiver (not shown) which provides the navigation function. However, the telematics device 100 may communicate with an additional terminal location information receiver included in the vehicle (10) through vehicle inner communication (for example, Controller Area Network (CAN) communication).

Figure 3:
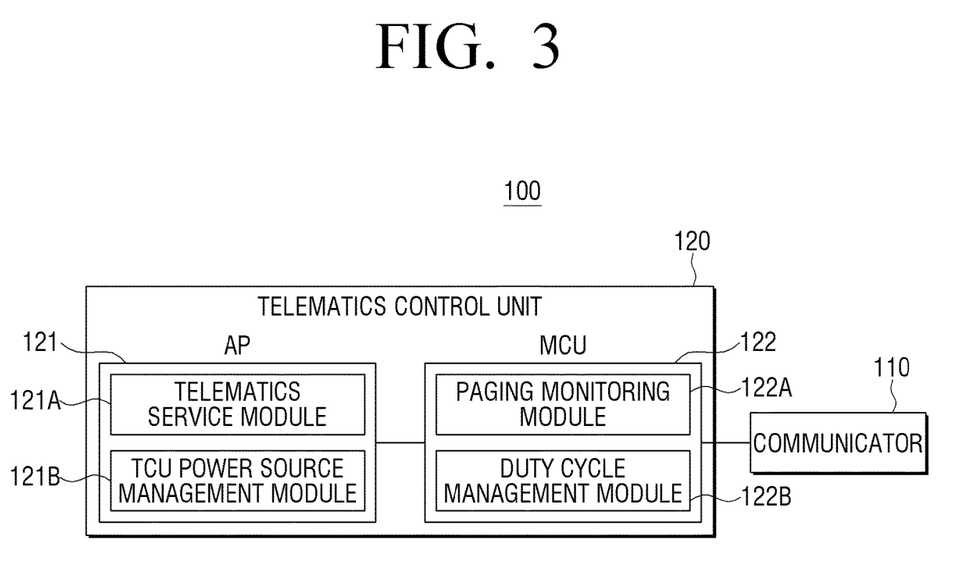
FIG. 3 is a block diagram illustrating an example configuration of the telematics device according to an example embodiment.

FIG. 3 is a block diagram illustrating an example configuration of the telematics device according to an example embodiment.

As illustrated in FIG. 3, the AP 121 may include a telematics service module (e.g., including processing circuitry and/or program elements) 121A and a TCU power source management module (e.g., including processing circuitry and/or program elements) 121B. The MCU 122 may include a paging monitoring module (e.g., including processing circuitry and/or program elements) 122A and a duty cycle management module (e.g., including processing circuitry and/or program elements) 122B.

The paging monitoring module 122A may periodically monitor whether the communicator 110 receives the communication connection request from the telematics server 200 through a paging channel. When the communicator 110 receives the communication connection request, the paging monitoring module 122A may transmit a control signal to turn on the power source of the AP 121 in the TCU power source management module 121B of the AP 121.

For example, the communicator 110 may transmit the communication connection request to an AUTOSAR (Automotive Open System Architecture) application through a Complex Device Driver (CDD) of AUTOSAR OS mounted on the MCU 122, and the AUTOSAR application may transmit the control signal to turn on the power source of the AP 121 in the TCU power source management module 121B.

The duty cycle management module 122B may be configured to adjust a duty cycle through which a current flows, that is, a turned-on period of the power source. Specifically, in the duty cycle management module 122B, the turned-on period of the power source of the MCU 122 may be adjusted based on the remaining battery power of the vehicle 10 which provides the power source to the TCU 120.

For example, the duty cycle management module 122B may increase a turned-on period of the MCU 122 when the remaining battery power is a predetermined threshold value or less.

The TCU power source management module 121B may be configured to adjust the power source supplied to the AP 121 and the MCU 122, and control the power source of the AP 121 to turn on when the control signal turning on the power source of the AP 121 is received from the MCU 122. In response to the power source turning on, the AP 121 may implement the RIL daemon and the PPP daemon and drive the telematics service module 121A.

When the communicator 110 receives the control command input from the user terminal device 300 through the telematics server 200, the received control command may be transmitted to the telematics service module 121A, and the telematics service module 121A may perform the telematics service such as the remote start, the vehicle condition monitoring, etc. according to the received control command.

Figure 4:
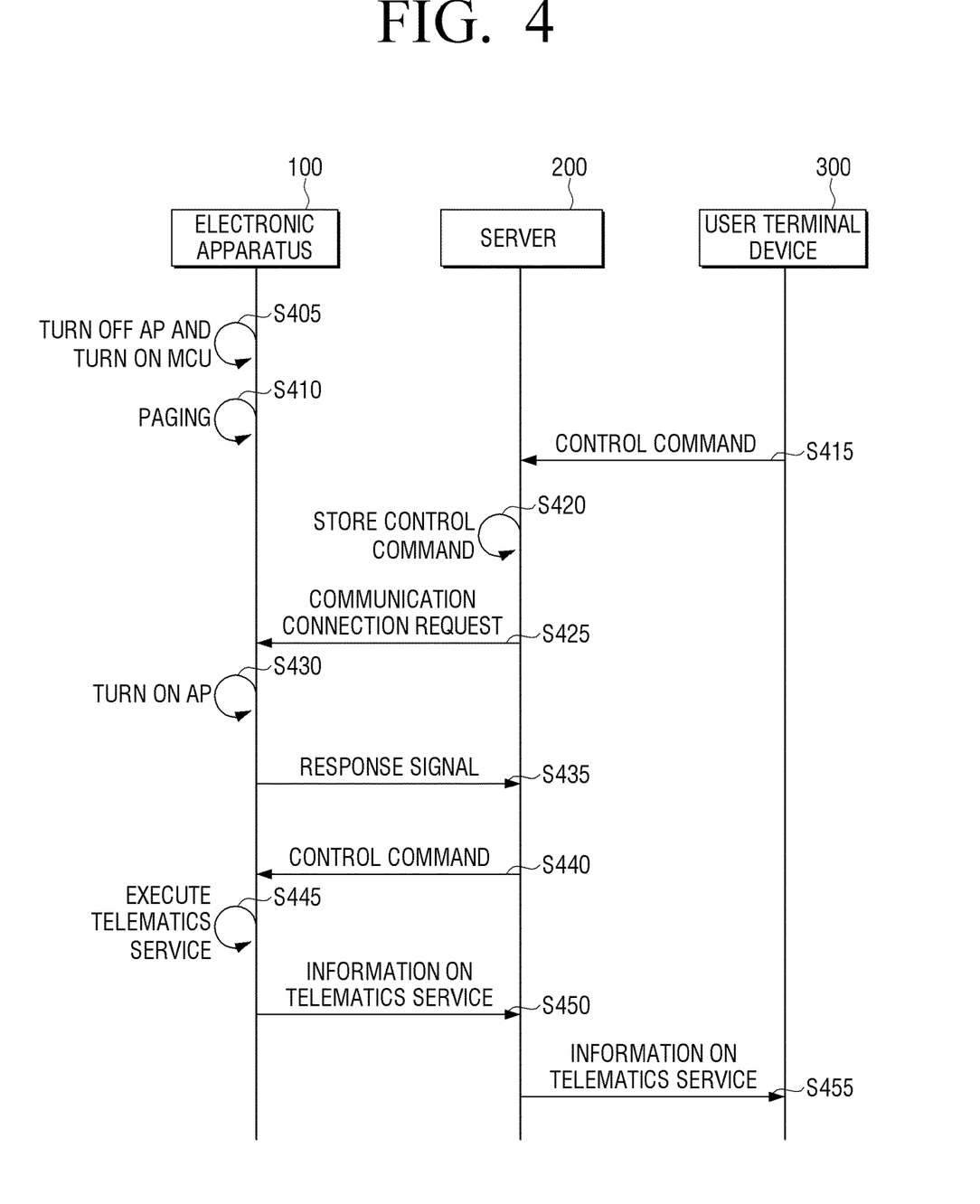
FIG. 4 is a sequence diagram illustrating an example operation sequence of the telematics system according to an example embodiment.

FIG. 4 is a sequence diagram illustrating an example operation sequence of the telematics system according to an example embodiment.

When the vehicle 10 is stopped or turned off, the power source of the AP 121 included in an electronic apparatus 100 may be turned off, and the MCU 122 may maintain a turned-on state (S405). The MCU 122 may repeat a turned-on state and a turned-off state on a predetermined period basis. The electronic apparatus 100 may continuously perform paging through the communicator 110 connected to the MCU 122 in the state in which the power source of the MCU 122 is turned on (S410).

Thereafter, the control command which requests the telematics service related to the vehicle 10 is input to the user terminal device 300, the user terminal device 300 may transmit the corresponding control command to the telematics server 200 that provides the telematics service (S415). The telematics server 200 may store the received control command (S420) and transmit the communication connection request regarding the electronic apparatus 100 (S425).

In response to the communication connection request being received from the telematics server 200, the electronic apparatus 100 may turn on the power source of the AP 121 (S430), and transmit the response signal in response to the received communication connection request to the telematics server 200 (S435). The telematics server 200 which receives the response signal may transmit the stored control command (S420) to the electronic apparatus 100 (S440), and the electronic apparatus 100 may forward the received control command to the AP 121 and execute the telematics service corresponding to the control command (S445).

The electronic apparatus 100 may transmit information on the telematics service (a vehicle's condition, a vehicle's operation, etc.) due to the execution of the telematics service to the telematics server 200 (S450), and the telematics server 200 may transmit the received information on the telematics service to the user terminal device 300 (S455).

Figure 5:
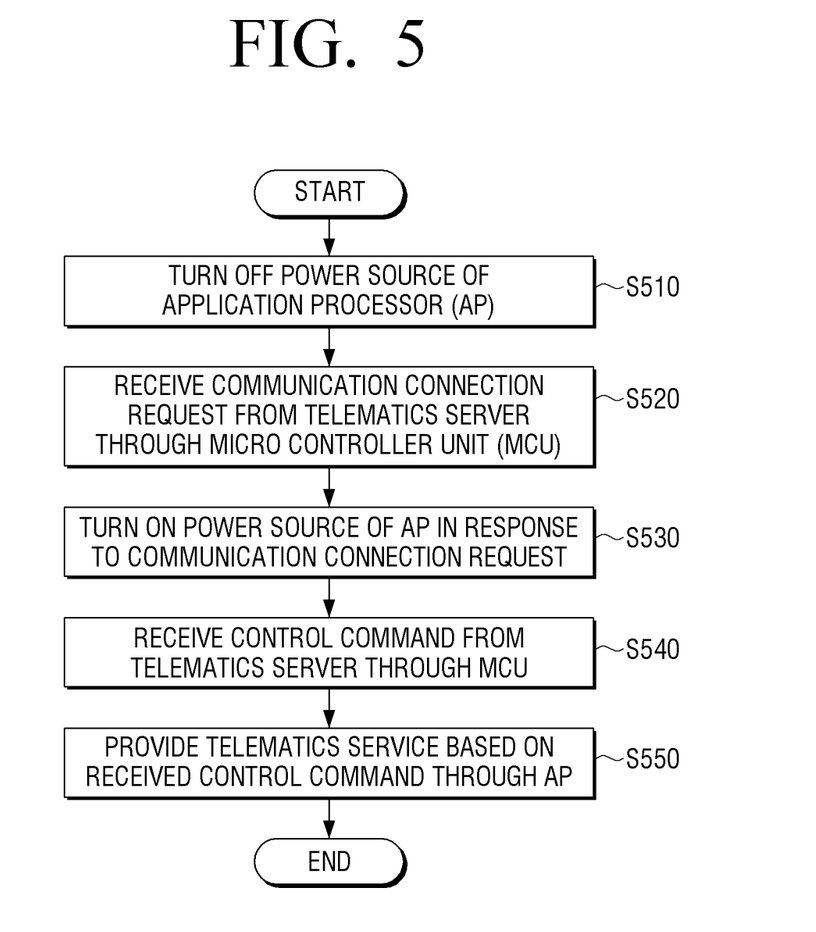
FIG. 5 is a flowchart illustrating an example method of controlling the telematics device according to an example embodiment.

FIG. 5 is a flowchart illustrating an example method of controlling the telematics device according to an example embodiment.

When a predetermined event occurs, for example, vehicle's stopping, a power source of an AP may be turned off (S510).

A communication connection request from a telematics server may be received through an MCU (S520). The MCU may turn on a power source according to a predetermined period, and in response to the power source of the MCU turning on, the MCU may perform paging of the communication connection request of the telematics server. In such a case, a period in which the power source of the MCU is turned on may be adjusted based on a remaining battery power of a vehicle.

In response to the communication connection request being received, a response signal in response to the communication connection request may be transmitted to the telematics server.

The power source of the AP may be turned on according to the received communication connection request (S530). In response to power source of the AP turning on, Radio Interface Layer (RIL) daemon and Point-to-Point protocol (PPP) daemon may be implemented.

Thereafter, when the telematics server receives the response signal, a control command may be received from the telematics server through the MCU (S540).

The control command received from the telematics server may be transmitted to the AP, and the AP receiving the control command may provide the telematics service (S550).

As such, according to various embodiments of the present disclosure, in the case where a user does not request telematics service, a power source of an AP having a relatively large power consumption may be turned off in a telematics device mounted on a vehicle, thereby reducing power consumption of the telematics device.

A method of controlling an electronic apparatus according to the above-described various example embodiments may be embodied as a program and stored in various record media. For example, a computer program which is processed by various processors and capable of implementing the above-described control methods may be used as being stored in a record media.

For example, a non-transitory computer readable medium which stores a program executing turning off a power source of an application processor (AP), receiving a communication connection request from an external device through a micro controller unit (MCU), turning on the power source of the AP in response to the communication connection request, receiving a control command from the external device, and the AP's providing telematics service in response to the received control command.

The non-transitory computer readable medium may refer to a medium that stores data and is readable by a device. For example, various applications or programs described above may be stored in the non-transitory computer readable medium such as Compact Disk (CD), Digital Versatile Disk (DVD), hard disk, Blu-ray disk USB, memory card, Read Only Memory (ROM), or the like.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic apparatus mounted on a vehicle, the electronic apparatus comprising:
   a communicator comprising communication circuitry configured to communicate with an external device;
   an application processor (AP); and
   a micro controller unit (MCU) comprising a micro controller configured to turn on a power source of the AP in response to a communication connection request being received from the external device in a state in which the power source of the AP is turned off,
   wherein the AP, in response to a control command being received from the external device after the power source is turned on, is configured to provide telematics service based on the received control command,
   wherein the MCU is configured to control the communicator to turn on a power source based on a predetermined period, in response to the power source being turned on, perform paging of a connection request from the external device, and adjust a paging period by adjusting a Slot Cycle Index (SCI) value or a Discontinuous Reception (DRX) value.

2. The electronic apparatus as claimed in claim 1, wherein the MCU, in response to a connection request being received from the external device, is configured to transmit a response signal regarding the connection request to the external device, and in response to the control command being received from the external device, to transmit the received control command to the AP.

3. The electronic apparatus as claimed in claim 1, wherein the MCU is configured to adjust a period in which the power source is turned on based on a battery power level of the vehicle.

4. The electronic apparatus as claimed in claim 1, wherein the MCU is configured to turn off the power source of the AP when the vehicle is turned off.

5. The electronic apparatus as claimed in claim 1, wherein the AP is configured to implement a radio interface layer (RIL) daemon and a point-to-point protocol (PPP) daemon in response to the power source being turned on.

6. A method of controlling an electronic apparatus mounted on a vehicle, the method comprising:
   turning off a power source of an application processor (AP);
   turning on a power source of the MCU based on a predetermined period; and
   paging a connection request from the external device in response to the power source of the MCU being turned on,
   receiving a communication connection request from an external device through a micro controller unit (MCU);
   turning on the power source of the AP based on the communication connection request;
   receiving a control command from the external device; and
   providing telematics service supplied from the AP based on the received control command,
   wherein the paging a connection request from the external device adjusts a paging period by adjusting a Slot Cycle Index (SCI) value or a Discontinuous Reception (DRX) value.

7. The method as claimed in claim 6, wherein the receiving of the control command from the external device comprises:
   transmitting a response signal regarding the communication connection request to the external device in response to the communication connection request being received;
   receiving the control command from the external device through the MCU in response to the external device receiving the response signal; and
   transmitting a control command provided to the MCU to the AP.

8. The method as claimed in claim 6, wherein the turning on of the power source of the MCU based on the predetermined period comprises adjusting a period in which the power source of the MCU is turned on based on a battery power level of the vehicle.

9. The method as claimed in claim 6, wherein the turning off of the power source of the AP comprises turning off the power source of the AP when the vehicle is turned off.

10. The method as claimed in claim 7, wherein the turning on of the power source of the AP based on the communication connection request comprises implementing a radio interface layer (RIL) daemon and a point-to-point protocol (PPP) daemon of the AP.

* * * * *